United States Patent [19]

Hirschfeld et al.

[11] Patent Number: 5,284,678
[45] Date of Patent: Feb. 8, 1994

[54] METHOD AND APPARATUS FOR COATING PARTICLES AGITATED BY A ROTATABLE ROTOR

[75] Inventors: Peter F. F. Hirschfeld, Freiburg; Manfred Weh, Istein, both of Fed. Rep. of Germany

[73] Assignee: Glatt GmbH, Binzen, Fed. Rep. of Germany

[21] Appl. No.: 910,440

[22] Filed: Jul. 8, 1992

[30] Foreign Application Priority Data

Jul. 11, 1991 [CH] Switzerland ............... 2068/91

[51] Int. Cl.⁵ .......................... B05D 1/02; B05C 5/04
[52] U.S. Cl. ............................... 427/212; 118/303; 118/320
[58] Field of Search ............ 427/212, 213; 118/303, 118/320, DIG. 5

[56] References Cited

U.S. PATENT DOCUMENTS

| | | | |
|---|---|---|---|
| 2,888,418 | 5/1959 | Albanese et al. | 427/213 |
| 3,447,950 | 6/1969 | Evans et al. | 118/303 |
| 4,323,312 | 4/1982 | Glatt et al. | 366/102 |
| 4,535,006 | 8/1985 | Naunapper et al. | 427/213 |
| 4,542,043 | 9/1985 | Abe et al. | 118/DIG. 5 |
| 4,690,834 | 9/1987 | Appelgren et al. | 118/303 |
| 4,740,390 | 4/1988 | Külling | 118/303 |
| 4,858,552 | 8/1989 | Glatt et al. | 118/303 |
| 4,895,733 | 1/1990 | Imanidis et al. | 427/8 |
| 4,935,246 | 6/1990 | Ahrens | 427/213 |
| 4,946,654 | 8/1990 | Uhlemann et al. | 118/DIG. 5 |
| 4,960,244 | 10/1990 | Maag et al. | 118/303 |
| 5,085,170 | 2/1992 | Hüttlin | 118/DIG. 5 |
| 5,132,142 | 7/1992 | Jones et al. | 427/196 |
| 5,236,503 | 8/1993 | Jones . | |

FOREIGN PATENT DOCUMENTS

| | | | |
|---|---|---|---|
| 741272 | 8/1966 | Canada | 427/213 |
| 0244550 | 11/1987 | European Pat. Off. . | |
| 2030104 | 12/1970 | Fed. Rep. of Germany . | |
| 3237303 | 4/1984 | Fed. Rep. of Germany . | |
| 2628014 | 9/1989 | France | 427/212 |

Primary Examiner—Terry J. Owens
Attorney, Agent, or Firm—Jacobson, Price, Holman & Stern

[57] ABSTRACT

An apparatus used for coating particles has a vessel in which a rotor which can be rotated about a vertical axis and possesses a disk. During coating of particles, the particles rest on the disk and are moved by the latter as a result of rotation, a process gas also being passed upward through an annular gap present between the wall of the vessel and the disk. The apparatus has at least one atomizing member which projects into the particle bed present on the disk. A coating material which is solid at room temperature is melted at least for the major part, sprayed by means of the atomizing member in the interior of the particle bed and onto the particles, and solidified by cooling. Pore-free and smooth coatings can be applied in this manner.

21 Claims, 2 Drawing Sheets

Fig.1

METHOD AND APPARATUS FOR COATING PARTICLES AGITATED BY A ROTATABLE ROTOR

BACKGROUND OF THE INVENTION

1. Field of the Invention

The invention relates to a method and an apparatus for coating particles. More precisely, the method and the apparatus are used for the batchwise coating of particles with a coating material which is at least partly liquid during coating.

The particles to be coated may contain, for example, at least one enzyme—such as a protease, lipase or maltase—and, for example, be intended for use as a component of a detergent. Furthermore, it is possible to coat particles which contain at least one pharmaceutical active substance—for example an antibiotic, ibuprofen, theophylline or diclophenac. Moreover, the particles may contain at least one organic acid likewise serving as a pharmaceutical active substance and/or as a nutrient and/or as a nutrient additive—such as citric acid or ascorbic acid—and/or a salt of such an acid. The particles may also contain, for example, at least one crop protection agent.

2. Description of the Prior Art

An apparatus disclosed in German Patent No. 2 030 104 has a vessel and a rotor which is rotatable therein about a vertical axis and has a disk which forms the lower limit of the processing space. An annular gap is present between the wall of the vessel and the edge of the disk. In the vessel, an atomizing nozzle is arranged above the disk. The disk is rotated during operation. The particles are alternately moved outward on the disk and lifted by a process gas flowing upward through the stated annular gap. The moving particles are sprayed from above with a liquid coating material and then dried.

Apparatuses of similar type are also disclosed in U.S. Pat. No. 4,895,733. These last-mentioned apparatuses are used mainly for the agglomeration of particles. However, the possibility of using these apparatuses for coating particles and for this purpose spraying the particles with a coating material by means of at least one atomizing nozzle which is arranged above the bed of the particles resting on the disk is also mentioned.

The coating materials used in the known methods and apparatuses usually consist of solutions and/or dispersions which contain a large amount, typically about 70% to 95% by weight, of liquid solvent and/or dispersing medium during spraying. A substantial disadvantage of the known methods and apparatuses previously described is therefore the fact that a great deal of energy and time are required for drying the sprayed particles, which is usually carried out with the aid of hot air. If the particles contain heat-sensitive substances—such as, for example, enzymes or antibiotics—the drying process must be carried out at an appropriately lower temperature to avoid damaging the said substances and then requires a longer time than when hot air is used. Furthermore, the solvent and/or dispersing medium which is present in the coatings and evaporates during drying of the coatings may give rise to pores and to bulges formed from burst bubbles. At least in the case of small dimensions, porous coatings are therefore permeable, with the result that the sealing and/or protective effect which the coatings are required to achieve in many cases is impaired or can be achieved to some extent only by extremely thick coatings. In addition, the surface roughness caused by the pores and bulges is undesirable in many cases.

In the known methods and apparatuses, water is frequently used as the solvent and/or dispersing medium. However, this may be disadvantageous in the coating of particles containing hydrolyzable substances.

Furthermore, various substances used for the formation of coatings—for example waxes—are soluble not in water but only in organic solvents. However, coating with coating materials which contain organic solvents gives rise to many problems because organic solvents are more or less toxic and are frequently flammable and therefore should not enter the environment.

SUMMARY OF THE INVENTION

It is therefore the object of the invention to provide a method and an apparatus which eliminate disadvantages of the known methods and apparatuses for coating particles. Starting from the known methods and apparatuses in which a solution and/or dispersion is sprayed onto the particles, it is therefore desirable in particular to reduce the energy and time required and to form compact, i.e. pore-free, and very smooth coatings. It should also be possible to dispense with the use of organic solvents.

This object is achieved, according to one aspect of the invention, by a method for coating particles which are introduced into a vessel and are agitated by rotating a rotor which is located under them and can be rotated about a vertical axis, so that they form a particle bed on the rotor, wherein at least a portion of the said coating material is melted, sprayed in the molten state onto particles present in the particle bed by means of at least one atomizing member and then solidified by cooling.

The present invention furthermore relates to an apparatus for coating particles with a coating material, comprising a vessel, a rotor which is rotatable therein about a vertical axis and has a supporting surface for supporting particles, a heating device for melting at least a portion of the coating material, and at least one atomizing member for spraying the at least partly melted coating material onto the particles.

The particles to be coated can be formed by agglomerating a fine-grained powder and may consist of at least approximately spherical agglomerated or granulated particles. However, the particles may instead be formed by extrusion and comminution of an extrudate and may be approximately cylindrical. Furthermore, each particle may consist of a single crystal and form a polyhedron. The sizes—i.e. the diameters or other characteristic dimensions—of the particles may be, for example, at least about 0.2 mm and at most about 4 mm. The sizes of the particles coated together—i.e. in the same batch—should advantageously be in as narrow a range as possible.

The coating material may consist, for example, of a single substance or of a mixture containing two or more substances, which substance or which mixture is solid at normal room temperature—i.e. at about 20° C. to about 25° C.—and is completely molten during atomization.

The coating material may furthermore contain at least one part which is solid at room temperature and forms a melt during atomization and consists of a single substance or of a mixture and also of solid particles which are dispersed in the melt during atomization. The proportion of the melt should preferably be at least 50% by weight and, for example, at least 80% by weight of the total coating material, so that said material, preferably at least for the major part, is thus molten during atomization. The solid particles dispersed in the melt should furthermore advantageously be substantially— for example at least 5 times—smaller than the particles to be coated and also smaller than the intended thickness of the coatings. It should be noted that certain suitable substances and especially mixtures thereof do not have an exactly defined melting point but a melting range in which, when the temperature is increased, they initially become soft and plastic, then viscous and finally completely liquid. The lower limit or threshold value of such a melting range is referred to as the solidus temperature and the upper limit or threshold value as the liquidus temperature. Below, the melting point with reference to substances or mixtures having a melting range is understood as being the liquidus temperature, unless stated otherwise.

The coating material or at least the part thereof which is molten during atomization preferably has a melting point which is at least 35° C., preferably at most 150° C. and, for example, 40° C. to 120° C. If the coating material or its meltable part has a melting range, the solidus temperature should preferably also be at least 35° C. and preferably at least 40° C.

The meltable coating material or the meltable part thereof may contain, for example, an alkane, an olefin, a natural or synthetic wax, a polyalcohol, a fatty ester or a mixture of such substances.

Some of the substances stated above as possible components of the coating material and in molten form during atomization are more or less transparent to light and more or less colorless—at least during the formation of thin coatings. The solid particles which may be present in the coating material and are dispersed in the melt forming its main component during atomization of said coating material may consist, for example, of a metal oxide—for example titanium dioxide—and may serve as a colorant in order to make the coatings opaque to light and, for example, to render the coatings white or impart another color to them.

In addition, a metal oxide, such as, for example, titanium dioxide, has a different—namely substantially greater—heat capacity than most of the substances stated previously and in molten form during atomization. Solid particles of titanium dioxide and/or of another metal oxide which are dispersed in the meltable main component of the coating material may therefore reduce the tendency of the coated particles to agglomerate during coating and/or in the time interval immediately thereafter.

The coating material sprayed onto the particles preferably contains neither an inorganic nor an organic solvent. Accordingly, the layers formed by spraying coating material onto the particles also need not be dried. By means of the method according to the invention, it is therefore possible to reduce the time required for coating a batch of particles by a factor of, for example, about 2 to 4 compared with previously known methods in which the coating material sprayed on contains a solvent and/or dispersing medium which is liquid at normal room temperature, the amounts of particles and coating thicknesses being the same.

By establishing the parameters of the method in a suitable manner explained in detail in the following description of embodiments, it is possible to ensure that the melt forming at least a part of the coating material when the latter is sprayed on solidifies sufficiently rapidly to avoid agglomeration of the sprayed particles. It is also possible to ensure that the coatings are still plastically deformable when, after the coating material has been sprayed on, the particles roll and/or slide over the support surface of the rotor and/or over one another, so that the coatings are compacted and smoothed. It is therefore possible to form coatings which are pore-free and are completely impermeable even with a small thickness. Furthermore, it is possible to form coatings having uniform thicknesses and smooth surfaces. If the particles to be coated are spherical, it is possible during coating to form, in particular, coatings whose surfaces are practically exactly spherical. Particularly in the case of spherical particles, the smooth surfaces of the coatings resulted in good flow properties and pourability of the particles. Depending on requirements, the coatings may have a thickness of, for example, about 0.001 mm to 0.5 mm, and the coatings produced using given parameters of the method may have thicknesses in a narrow range.

BRIEF DESCRIPTION OF THE DRAWINGS

The object of the invention is now illustrated with reference to an embodiment shown in the drawings. In the drawings.

DESCRIPTION OF THE PREFERRED EMBODIMENT

Figure 1:
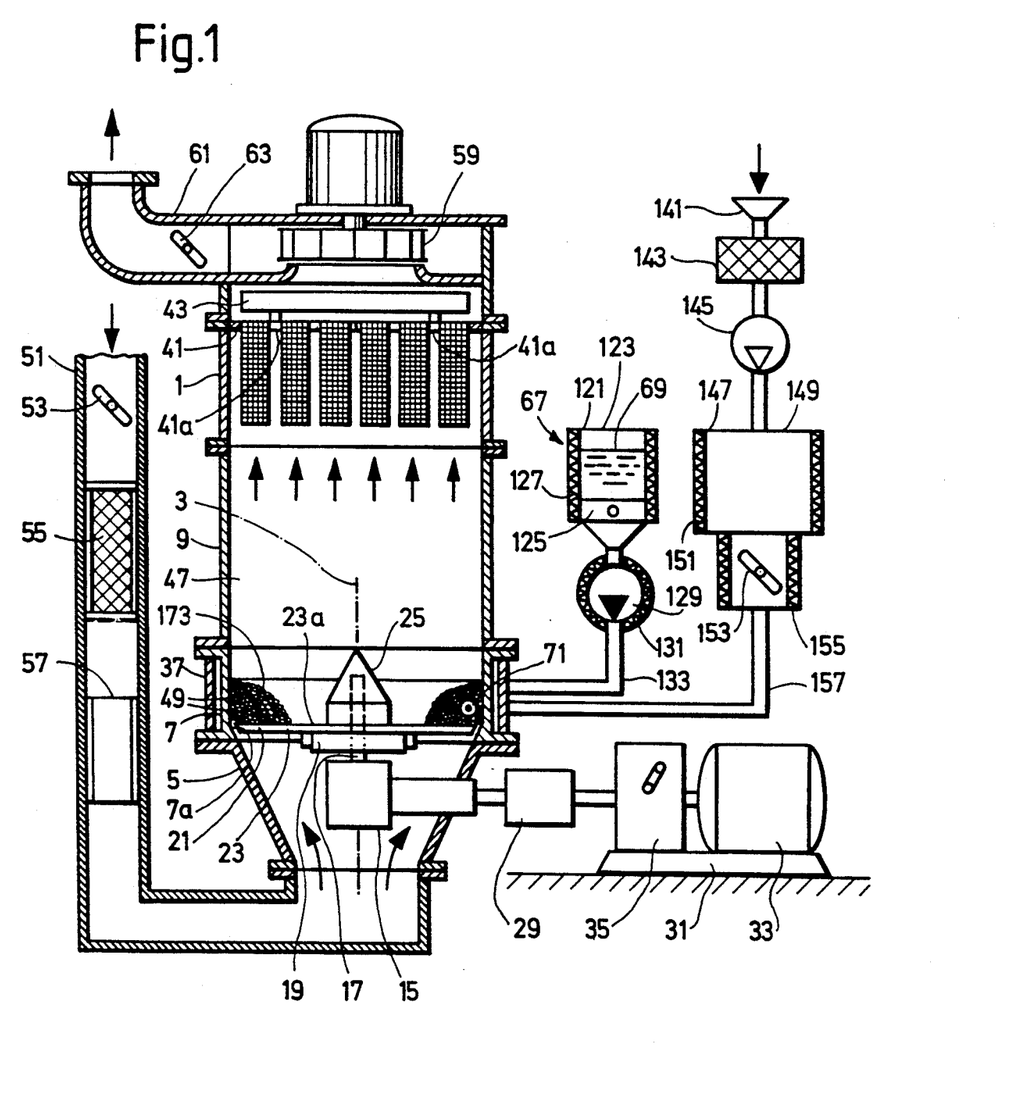
FIG. 1 shows a schematic representation of an apparatus for coating particles, having a vessel which is shown in simplified form in vertical section and contains a rotor.

The apparatus shown in FIG. 1 has a vessel 1 which is held by a frame which is not shown. The vessel 1 has a vertical axis 3 and is generally rotationally symmetrical with respect to said axis. The wall of the vessel is formed from a plurality of parts, at least some of which are detachably connected to one another, and has a wall with a wall part 5 which is arranged at the lower end of the vessel and extends conically upward. Said wall part is connected at its upper end to a wall part 7 whose inner surface forms, at the lower end, a seat 7a extending conically upward and is cylindrical above this. A multi-piece cylindrical wall part 9 is located above the wall part 7.

A bearing and transmission unit 15 is arranged in that part of the vessel bounded by the conical wall part 5 and has a housing fastened by arms to the conical wall part 5. A shaft 17 is mounted around the axis 3 in the unit 15. The rotor 21 which is rotatable around the axis 3 is arranged above the unit 15 with an adjusting device 19 which can be operated manually from outside the vessel, on said adjusting device and in a manner such that the height can be adjusted along the shaft 17. The rotor 21 is furthermore connected by means of a sliding clutch to the shaft 17 so that it can be rotated by this. The rotor 21 has a circular disk 23. This has a flat supporting surface 23a on its upper side and, at its edge, a conical edge surface whose angle of inclination is equal to that of the surface which forms the seat 7a. The disk 23 can be moved from a lower end position, in which its edge surface rests at least approximately tightly on the seat 7a, upward to positions in which an annular gap is present between the wall of the vessel 1 and its edge. The radial width of said annular gap can be changed by adjusting the height of the disk. The rotor also has a cap 25 which is arranged on the upper side of the disk 23 in the center of the latter and whose outer surface for the most part tapers conically upward. The bevelled gear which connects the shaft 17 by a torque measuring device 29 to a drive device 31 which has an electric motor 33 and a gear 35 for stepless adjustment of the speed is arranged in the housing of the bearing and transmission unit. It should be noted that further details and possible embodiments of the bearing and transmission unit 15, of the adjusting device 19, of the torque measuring device 29 and of the drive device 31 are described in U.S. Pat. No. 4,895,733 cited in the introduction and also in U.S. Pat. No. 4,323,312.

In the wall part 7, the wall of the vessel 1 is provided with a heating and/or cooling device 37. As shown particularly clearly in FIG. 2, this has, as the main component, a shell which, together with the wall part 7, defines a cavity which approximately encloses said wall part and serves as a passage 37a for a heating and/or cooling fluid—for example water. A connection 37b or 37c is present at each of the two ends of the passage, of which connection 37b is located at the lowest region of the passage 37a and connection 37c at the highest region of passage 37a.

The various parts of the wall of vessel 1 preferably consist essentially—i.e. apart from any transparent window present and from seals and the like—of at least one metallic material, for example stainless steel. However, the wall and/or the heating and/or cooling device 37 may be provided with a heat insulation if the intended modes of operation and operating temperatures require this.

A filter 41 is arranged above the rotor 21 in the vessel 1 and has two sections 41a which are of about the same size and which can be shaken by means of a shaker 43. That region of the interior of the vessel 1 which is bounded at the bottom by the rotor 21 and at the top by the filter 41 forms a processing space 47, which is sealed gas-tight from the environment, for receiving the particles 49 to be processed, namely to be coated.

Gas conducting and gas conveying means have a gas supply conduit 51 which connects an ambient air inlet, which is not shown, via a flow regulating member 53, a filter 55 and a heating and/or cooling device 57 to an opening present at the lower end of the conical wall 5 of the vessel 1. The gas conducting and gas conveying means furthermore comprise a pump device 59 which is designed for suction and has a flywheel arranged above the filter 41, in or on the vessel 1. The outlet of the pump device 59 is connected via a gas exhaust conduit 61 and a flow regulating member 63 to an outlet opening into the environment.

Figure 2:
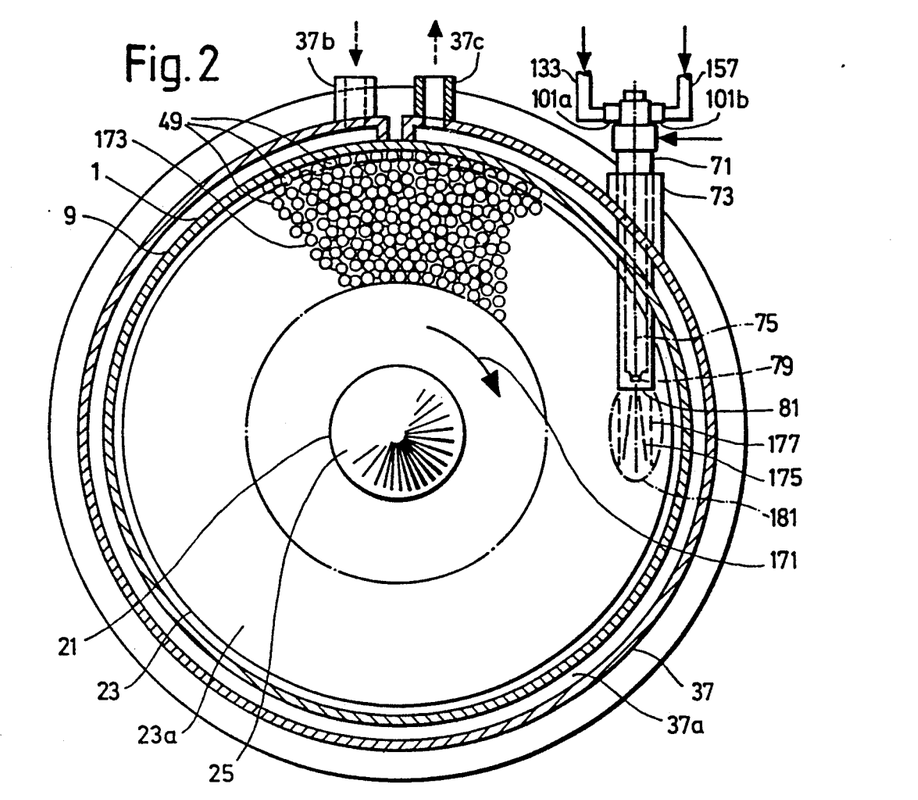
FIG. 2 shows a simplified horizontal section through a part of the vessel on a larger scale than FIG. 3 shows a simplified longitudinal section through the atomizing member of the apparatus on an even larger scale than FIG. 2.

The apparatus is provided with feeding means 67 for feeding and atomizing a coating material 69. The feeding means 67 have an elongated, straight atomizing member 71 which is also shown in FIG. 2 and furthermore shown separately in FIG. 3. Said member is detachably fixed to the vessel 1 by a sleeve 73 fastened to the heating and/or cooling device 37 and/or to the wall part 7 and projects through its wall 9 into the processing space 47. The processing space 47 and the passage 37a are tightly sealed from one another and from the environment at the point of penetration of the atomizing member 71. The atomizing member 71 has a straight axis 75 and is in general rotationally symmetric with respect to said axis. The axis 75 of the atomizing member is horizontal and skew with respect to the axis 3 of the vessel and thus does not intersect the axis 3. In the vertical plan view shown in FIG. 2, the axis 75 of the atomizing member intersects the edge of the disk 23 at an angle of at most 60° and preferably at most 45°. At that end of the atomizing member which is present in the processing space 47, its axis 75 makes—in vertical plan view—an angle of at most 45° and preferably at most 30° with a circle concentric with the axis 3 and is in fact almost or approximately tangential to such a circle.

The diameter of the disk 23 may be, for example, approximately in the range from 20 cm to 200 cm. During spraying, the rotor 21 can furthermore be brought into a position in which it is preferably at most 2 cm and, for example, at most or about 1 cm above its lowest possible position in which it closes the seat 7a. That part of the atomizing member 71 which is present in the processing space 47 can have a radius of, for example, about 1 cm to 3 cm and namely approximately 2 cm. Depending on the diameter of the disk 23, the axis 75 of the atomizing member can then be arranged at most about 10 cm, preferably at most 6 cm and, for example, 3 cm to 5 cm above the supporting surface 23a if the rotor 21 is in its lowest possible position and/or in its position assumed during the spray process. The axis 75 of the atomizing member is furthermore preferably at most 30% and, for example, at most 20% or even only at most 10% of the diameter of the disk 23 above its supporting surface 23a when the rotor 21 is in its lowest possible position and/or in its position assumed during the spray process.

Figure 3:
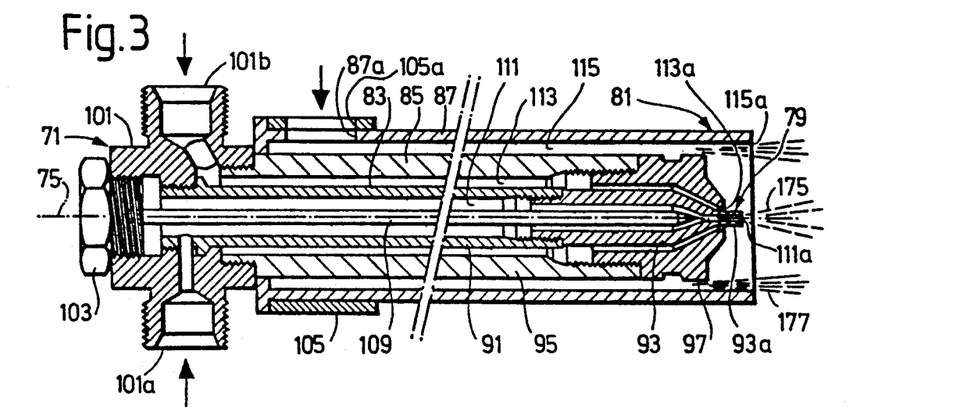

The atomizing member 71 has an inner nozzle 79 which is in the form of a so-called two-material nozzle, serves for atomizing the coating material 69 and is also referred to as coating material nozzle 79. The atomizing member 71 furthermore has an outer nozzle 81 which is also referred to as envelope gas nozzle 81. The atomizing member has three elongated sleeves 83, 85, 87 which are coaxial with the axis 75 and are generally rotationally symmetric and enclose one another, namely an inner sleeve 83, an intermediate sleeve 85 and an outer sleeve 87. The inner sleeve 83 consists of a generally cylindrical tube 91 and an outlet member 93 which is connected thereto by a screwed thread. The outlet member 93 has—adjacent to the tube 91—a cylindrical part, a part tapering conically away from this and, at its free end, a thinner cylindrical end portion 93a. The intermediate sleeve 95 likewise consists of a generally cylindrical tube 95 and an outlet member 97 connected to it by a thread connection. Those ends of the three sleeves 81, 83, 85 which are on the right in FIG. 3 are arranged in the processing space 47. The atomizing member 71 has, at its end present on the left in FIG. 3 and furthermore outside the vessel 1, a connection member 101 having a continuous, axial stepped hole provided with inner threads. The tubes 91, 95 of the two sleeves 83 and 85, respectively, are detachably screwed into this inner thread and furthermore sealed from the connection member 101. The connection member 101 is provided with two parts, each of which forms a threaded coupling. One of these couplings serves as the coating material inlet 101a of the atomizing member. The other coupling serves as the first gas inlet 101b or the atomizing gas inlet 101b of the atomizing member. That end of the axial hole of the connecting member 101 which faces away from the sleeves 83, 85, 87 is tightly closed off by a detachably screwed-in closure member 103. The outer sleeve 81 essentially consisting of a cylindrical tube is connected, at its end on the left in FIG. 3, detachably or undetachably and tightly to the intermediate sleeve 85 and/or to the connection member 101 and has, close to this end, a hole which passes through its wall and forms a second gas inlet and/or envelope gas inlet 87a. An adjusting ring which encloses the outer sleeve 87 and is rotatable about the latter serves as a flow regulating member 105 and has a hole 105a. By turning the regulating member 105, said hole 105a can be made to coincide either completely or to a greater or lesser extent with the hole forming the envelope gas inlet 87a in the sleeve 81 or can be displaced from the latter hole so that the passage cross-section of the passage formed by the two holes can be changed or the envelope gas inlet 87a of the atomizing member 71 can even be more or less tightly sealed. A pin 109 which is coaxial with the axis 75 and extends into the inner sleeve 83 approximately up to its end portion 93a is fixed to the closure element 103.

The coating material inlet 101a has a hole opening into the inner space of the inner sleeve. That region of the inner space of the inner sleeve 83 which is left open by the pin 109 forms an inner and/or coating material passage 111. This has—from left to right in FIG. 3—a cylindrical main part, a conically tapering part and an inner and/or coating material outlet 111a which is formed by the cylindrical hole of the end portion 93a of the outlet member and opens into the processing space 47.

The first gas inlet or atomizing gas inlet 101b has a hole which opens into the cavity present between the inner sleeve 83 and the intermediate sleeve 85. This cavity forms an intermediate and/or atomizing gas passage 113, has a circular cross-section and possesses—from left to right in FIG. 3—a generally cylindrical part, a conically tapered part and a short cylindrical end portion which opens into the processing space and forms an intermediate and/or atomizing gas outlet 113a.

The second gas inlet or envelope gas inlet 87a opens into a cavity present between the sleeves 85 and 87. This cavity serves as outer and/or envelope gas passage 115 and forms, at its end located in the vessel 1, a generally circular outer and/or envelope gas outlet 115a opening into the processing space 47. The outer sleeve 81 may be supported, in the vicinity of that end of the tube 95 of the intermediate sleeve 85 which is opposite the connection member 101, on said intermediate sleeve by spacing means which are not shown. These spacing means should be formed so that they hinder as little as possible the gas flow through the passage 115 and may consist, for example, of a few spacers distributed around the circumference of the intermediate sleeve and fixed to its tube 95 or to the outer sleeve 81 or of a ring provided with holes and webs distributed around its circumference.

The atomizing member consists, for example, essentially—i.e. apart from any seals—of metallic material, for example stainless steel. The outer sleeve 81 and the adjusting ring 105 can, however, consist of a plastic—for example polypropylene instead of steel. Furthermore, the intermediate sleeve 85 and/or the connection member 101 and/or the closure member 103 may be provided with a heat insulation or may be formed from a heat-insulating material instead of a metallic material.

According to FIG. 3, the outlet member end portion 93a limiting the inner and/or coating material outlet 111a projects in the axial direction slightly out of the outlet member 97 of the intermediate sleeve 85. Furthermore, that end of the outer sleeve 87 which limits the outer and/or envelope gas outlet 155a projects in the axial direction slightly beyond the intermediate sleeve 85. The outer and/or envelope gas outlet 115a thus encloses the outlets 111a and 113a. Otherwise; all three outlets 111a, 113a, 115a are coaxial and rotationally symmetric to the atomizing member axis 73. Accordingly, the centers of the mouths of the outlets 111a, 113a, 115a are on the atomizing member axis 75 and thus also in the height range, stated for this axis, above the supporting surface 23a of the disk 23.

The feeding means 67 have a melting device 121. This has, for example, a store 123 which is dimensioned so that it can hold at least the amount of coating material 69 which is required for coating a batch of particles 11. The store 123 has, at its lower end, an outlet which is provided, for example, with a shut-off device 125, and the shut-off device may have, for example, a slide valve. The melting device 121 has a heating device 127 which has, for example, at least one electrical heating resistance or at least one passage for a heating fluid and by means of which the wall of the store 123 or at least the coating material 69 contained therein and, for example, also the shut-off device 125 can be heated. The outlet of the melting device which can be shut off is connected to a conveying and metering device 129 which is formed, for example, by a peristaltic pump or a screw conveyor and can be heated, for example, by means of a heating device 131. The outlet of the conveying and metering device 129 is connected via a pipe 133 to the coating material inlet 101a of the atomizing member 71.

The feeding means 67 furthermore have a device for feeding atomizing gas. This device has an air inlet 141 which is connected via a filter 143 and a pump 145 to a gas heater 147. The latter has, for example, a store 149 which serves for storing compressed air and a heating device 151. The outlet of the gas heater 147 is connected via a flow regulating and shut-off member 153, which for example is likewise provided with a heating device 155, and a pipe 157 to the first gas inlet or the atomizing gas inlet 101b of the atomizing member 71. Otherwise, the melting device 121, the metering and conveying device 129, the gas heater 147, the flow regulating and shut-off member 153 and the pipes 133, 157 may also have, for example, heat insulations and/or may be partly formed from heat-insulating materials. If necessary, the pipe 133 which serves for feeding the molten coating material 69 to the atomizing member 71 may furthermore be equipped with a heating device.

The apparatus is also provided with means for introducing the particles to be coated into the processing space 47 of the vessel 1 and for removing the coated particles. Depending on the size of the vessel 1, these means may be formed in one or other known manner. The apparatus may also have, for example, a lifting and lowering device which engages the conical wall part 5 and, when the vessel is closed, enables said wall part to be pressed upward against the wall part 7 and the wall part 9 fixed to the frame (not shown) or to be lowered for opening the vessel. However, the vessel may have, instead or in addition, a closable inlet and a closable outlet for introducing the particles to be coated or for removing the particles to be coated.

Furthermore, sensors may be present in order to measure the temperature and/or the pressure of the gas flowing through the processing space 47 during operation and/or the temperature of the particles present in the processing space 47 and/or the temperature of the coating material fed to the atomizing member 71 and/or the temperature of the air fed in as atomizing gas. Moreover, a control and monitoring device which is not shown is present and is connected to the motors of the drive device 31, of the suction device 39, of the conveying and metering device 129 and the pump 145, with any adjusting members of the flow regulating and shut-off members, the various heating and/or cooling devices, the torque measuring device 29 and any other sensors present. The control and monitoring device has manually operatable actuating members, display and/or registration devices and electronic and possibly pneumatic and/or hydraulic components in order to control and to monitor operation, and, for example, manual or automatic control is possible.

The process for coating particles 49 is described below.

It is assumed that the rotor 21 does not rotate initially and is in its lowest possible position, so that the disk 23 rests on the seat 7a. A batch of particles 49 to be coated is now introduced into the processing space 47 and is caused to rest on the disk 23. The amount of these particles 49 is such that, when the rotor 21 is rotating, they then cover and enclose that part of the atomizing member 71 which is present in the processing space 47, and in particular its outlets 111a, 113a, 115a as shown in FIG. 1.

When the particles 49 are introduced into the vessel 1 and the latter is closed, the rotor 21 is raised so that an annular gap is formed between the wall of the vessel, or more precisely the seat 7a, and the disk 23. Furthermore, the pump device 59 is switched on at the latest when the rotor is raised, so that said device sucks process gas formed by air sucked in from the environment upward through the vessel 1 and in particular through the said annular gap and the processing space 47. The flow rate of this process gas is adjusted with the aid of the flow regulating members 53, 63 in such a way that the process gas passing through the annular gap prevents the particles 49 from falling through the annular gap and may slightly raise the particles in the region of the annular gap, although at least the major part of the particles still rests on the disk 23 and is thus not fluidized. The gas supply conduit 51, the flow regulating member 53, the filter 55, the device 57, the said annular gap and the particles 49 exert a resistance against the air stream so that the pressure in the processing space is smaller, by a certain pressure difference, than the air pressure prevailing in the environment of the vessel. This pressure difference can be influenced by the setting of the rotor height and the resulting width of the said annular gap and by the flow regulating member 53 and is, for example, at least 1 kPa.

The particles 49 to be coated may consist, for example, of at least approximately spherical enzyme agglomerates which are intended to be added to a detergent. The coating material used may be, for example, a polyalcohol, namely low molecular weight polyglycol, whose melting point is, for example, in the range of 56° C. to 60° C. The process gas sucked through the gas supply conduit 51 and the annular gap present between the wall of the vessel 1 and the disk 23 into the processing space 47 may in this case be at room temperature and therefore need be neither heated nor cooled by means of the heating and/or cooling device 57. Similarly, the wall part 7 of the vessel 1 also may be neither heated nor cooled by means of the heating and/or cooling device 37. The particles present in the particle bed 173 are then at about room temperature prior to spraying.

After the disk 23 has been raised from the seat 7a, the rotor 21 is rotated in the direction of rotation designated by arrow 171 in FIG. 2. The circumferential speed of the disk 23 may be, for example, in the range from 5 m/s to 30 m/s. The rotating disk 23 moves the supported particles 49 around the axis. The rotating of the disk furthermore gives rise to a centrifugal force. The latter moves the particles 49 resting directly on the supporting surface 23a of the disk 23 and the particles 49 present at a small height above said disk and incidentally also the air adjacent to the disk away from the axis 3 toward the wall of the vessel. The lower particles move outward along more or less spiral paths until they are stopped by the wall of the vessel 1 and are raised by subsequently arriving particles and by the process gas flowing upward between the disk 23 and the wall. Owing to the gravitational force, the raised particles then move downward and back toward the axis 3. The particles form, in the outer region of the disk 23, an annular particle bed 173 which, in vertical section, has approximately the shape shown in FIG. 1. When the rotor 21 is rotated in the direction designated by arrow 171, a part of the disk 23 instantaneously located under the outlets 11a, 113a, 115a when viewed in the vertical direction has a speed or—more precisely—tangential speed which, in terms of magnitude, has a large component parallel to the axis 75 of the atomizing member 71 and is directed from its outer end to its outlets and from these into the free processing space 47.

Before the coating process, at least the amount of coating material 69 in the solid aggregation state at room temperature which is required for coating a batch of particles 49 is introduced into the melting device 121, heated therein at least to its melting point and expediently to a slightly higher temperature and melted. During melting, the coating material can be heated, for example, to a temperature which is at least 5° C. or at least 10° C. greater than the melting point. The coating material 69 melted in the melting device 121 is fed by means of the conveying and metering device 129 through the pipe 133 to the coating material inlet 101*a* of the atomizing member 71, the conveying and metering device and possibly the pipe 133 being heated if necessary in order to keep the coating material in the liquid state.

The pump 145 sucks air from the environment and pumps it into the gas heater 147. The air is heated in its store 149 with the aid of the heating device 147 and is then fed as atomizing gas to the atomizing gas inlet 101*b* of the atomizing member 71 via the flow regulating and shut-off member 153 which, for example, is likewise heated. The air forming the atomizing gas is heated by the gas heater so that, when flowing into the atomizing gas inlet 101*b* of the atomizing member, it has a temperature which is greater, namely preferably at least 20° C., for example 30° C. to 40° C. and namely about 35° C. greater, than the melting point of the coating material.

The molten coating material is fed to the coating material inlet 101*a*, flows through the inner and/or coating material passage 111 to the inner and/or coating material outlet 111*a* and is atomized therein, in the interior of the particle bed 173, by the atomizing gas consisting of heated compressed air and flowing from the atomizing gas inlet 101b through the intermediate and-/or atomizing gas passage 113 to the intermediate and-/or atomizing gas outlet 113a. A coating material jet 175 indicated in FIGS. 2 and 3 is formed.

Since the pressure in the processing space 47 is below the air pressure in the environment of the vessel 1, air serving as envelope gas is sucked through the second gas inlet and/or envelope gas inlet 87a—if this is at least partly opened by the regulating member 105—from the environment into the outer and/or envelope gas passage 115 and through the latter and through the outer and/or envelope gas outlet 115a into the processing space 47. The suction effect of the reduced pressure prevailing in the processing space is reinforced by virtue of the fact that the disk 23 moves the particles resting on it in a direction away from the atomizing member 71, past its outlets 111a, 113a, 115a. Fur the disk 23. The result of these contacts is that the still plastically deformable coating material sprayed beforehand onto the particles is solidified and is distributed over the particle surfaces. Any pores present beforehand in the layers or coatings formed by the coating material are closed, and the surfaces of the coatings are smoothed. After the intended amount of coating material has been sprayed on, the rotor may be further rotated for a short time without coating material being sprayed on, in order further to solidify and to smooth the coatings formed.

Particles having compact, pore-free, smooth coatings of uniform thicknesses can be formed in this manner. These thicknesses can be established by adjusting the size of the droplets formed during atomization of the coating material and by the duration of the coating process.

The surfaces of the uncoated particles are frequently relatively rough so that the coatings produced by the coating process have smoother surfaces than the uncoated particles. Furthermore, the surfaces of the layers or coatings formed during spraying are in any case smoothed in the previously described manner after spraying. Accordingly, the torque required for rotating the rotor 21 decreases during the coating process. The torque can be measured with the aid of the torque measuring device 29 and is then a measure of the smoothness and hence the quality of the surfaces of the coatings. The values of the torque and/or the changes thereof as a function of time can therefore be used to control the method and/or in particular to determine the time for terminating it.

After a batch of particles has been coated, they can be removed from the vessel, this being effected in a manner dependent on the above-mentioned means for introducing and removing the particles. The removal of the particles may be effected, for example, by stopping the rotor 21 and lowering it to its lowest possible position in which it rests on seat 7a and closes off the vessel 1 below the processing space 47. The pump 59 can then also be switched off. Furthermore, the conical wall part 5 can then be lowered slightly by means of the above-mentioned lifting and lowering device, so that the wall part 7 together with the rotor 21 and the particles resting thereon can be temporarily removed from the remaining vessel.

After removal of the coated particles from the vessel 1, a new batch of particles may be coated.

The method and the apparatus can be modified in various ways.

The coating material can, for example, have a melting point which is above or below the range stated above for low molecular weight polyglycol, namely approximately within the range stated in the introduction. For example, a high molecular weight polyglycol melting at about 110° C. to 115° C. or a synthetic fat melting in the range from 42° C. to 44° C. and consisting of superhydrogenated triglyceride can be used as coating material. As likewise already mentioned in the introduction, the coating material may contain, in addition to a main component which is molten when atomized, fine solid particles, for example titanium dioxide particles, dispersed therein.

If the coating material or its component intended for melting has a relatively high melting point, for example at least about 80° C., it may be advantageous to heat the wall part 7 of vessel 1, which wall part encloses the particle bed 173, and the process gas by means of the heating and/or cooling device 37 or 57, respectively. The temperatures of the wall part 7 and of the process gas should, however, still be below the melting point of the coating material and, for example, at least 20° C. or at least 30° C. less than this. If the coating material has a melting range, the temperature of the wall part 7 and of the process gas should also be lower than the solidus temperature of the coating material. If necessary, the envelope gas may also be heated to about the same temperature as the process gas.

If, on the other hand, the melting point of the coating material is relatively low and is, for example, less than 60° C. or even only at most 50° C., it may be advantageous to cool the wall part 7 enclosing the particle bed by means of the heating and/or cooling device 37 and to cool the process gas by means of the heating and/or cooling device 57. Furthermore, cooling may be useful if the particles to be coated contain a substance which may be damaged by even small temperature increases. Otherwise, it is even possible to provide for cooling of the envelope gas.

If the apparatus is intended exclusively for methods in which that wall part of the vessel which encloses the particle bed and the process gas are at room temperature, the two heating and/or cooling devices 37 and 57 can of course also be omitted.

The apparatus may furthermore have two or more atomizing members which are distributed around the axis 3. Furthermore, the or each atomizing member may be inclined, but the atomizing member axis should make an angle of, preferably, at least 45° and particularly preferably at least 60° with a vertical straight line.

In addition, the or each atomizing member may be angled and, for example, arranged so that its part located outside the processing space is radial with respect to the axis of the vessel. In this case, the statements made above in connection with the arrangement of the axis of the atomizing member are then applicable in general terms to the axis of that part of the atomizing member which forms the outlets.

It is also possible to provide means for feeding to the envelope gas inlet of the or each atomizing member an envelope gas at a pressure which is greater than the air pressure in the environment of the vessel.

Furthermore, the apparatus may be formed in order to use, instead of air, another gas—for example nitrogen or argon—as process gas, as atomizing gas and as envelope gas. Furthermore, it is possible to omit the atomizing gas passage of the atomizing member and to atomize the coating material merely by the effect of a pressure.

What is claimed is:

1. A method for coating particles which are introduced into a vessel having a wall and a rotor, the rotor being rotatable about a vertical axis, wherein the method comprises the steps of agitating the particles during the coating of the particles by rotating said rotor which is located under the particles so that the particles form a particle bed on the rotor, wherein during coating of the particles, a process gas is passed upward through an annular gap present between the wall and the rotor, wherein at least one atomizing member defining an atomizing member axis and having a coating material outlet, an atomizing gas outlet and an envelope gas outlet is provided, wherein the envelope gas outlet encompasses the atomizing gas outlet which in turn encompasses the coating material outlet when viewed in a direction parallel to the atomizing member axis, wherein the at least one atomizing member is disposed to protrude into the particle bed and said outlets are inside the particle bed, wherein at least a portion of a solid coating material is melted and then sprayed through said coating material outlet in the molten state onto particles present in the particle bed wherein the coating material forms, during spraying, a coating material jet emerging from the coating material outlet, and wherein atomizing gas emerges through said atomizing gas outlet and the coating material is atomized with the aid of the atomizing gas whose temperature is greater than the melting point of the molten coating material or of its molten part, and wherein an envelope gas jet emerging from the envelope gas outlet is produced such that the envelope gas jet is radially spaced from the coating material jet in a space region that is inside the particle bed and adjacent to said outlets and wherein the molten coating material sprayed onto the particles is then solidified by cooling.

2. A method as claimed in claim 1, wherein the temperature of the process gas is lower than the melting point of the molten coating material or of its molten part.

3. A method as claimed in claim 1, wherein said coating material jet has an axis and is directed in such a way that the axis makes an angle of at least 45° with said vertical axis, and the velocity of the coating material at the axis of the coating material jet velocity of that region of the rotor which is vertically below the coating material jet.

4. A method as claimed in claim 3, wherein the axis of the coating material jet is horizontal.

5. A method as claimed in claim 1, wherein the temperature of the atomizing gas is at least 20° C. greater than the melting point of the molten coating material or of its molten part.

6. A method as claimed in claim 1, wherein the temperature of the gas forming said envelope gas jet is lower than the melting point of the molten coating material or of its molten part.

7. A method as claimed in claim 1, wherein at least 50% by weight of coating material is molten during spraying of said material, and wherein the melting point of the molten coating material or of its part which is molten during spraying is at least 35° C. and at most 150° C.

8. A method as claimed in claim 1, wherein at least 50% by weight of the coating material is molten during spraying of said material, and wherein the melting point of the molten coating material or of its part which is molten during spraying is 40° C. to 120° C.

9. A method as claimed in claim 1, wherein the envelope gas jet is generally parallel to the axis of the coating material jet and to the atomizing member axis.

10. A method as claimed in claim 1, wherein the envelope gas jet emerging from the at least one atomizing member is adapted to produce a cavity in the particle bed, adjacent to the outlets, which cavity contains fewer particles per unit volume than the remaining particle bed, or no particles at all, so that the particles closest to the coating material outlet are separated by voids.

11. A method as claimed in claim 1, wherein each particle is moved several times in succession past the coating material outlet of said at least one atomizing member and sprayed thereby during a spray interval with molten coating material and wherein each particle is moved over the rotor and cooled during cooling intervals between successive spray intervals so that the coating material sprayed on a particle can be plastically deformed during the cooling intervals when the particle touches at least one of another particle, of the supporting surface of the rotor, or of the wall.

12. A method as claimed in claim 1, wherein the temperature of the process gas and of an envelope gas forming the envelope gas jet are below the temperature of the atomizing gas.

13. A method as claimed in claim 1, wherein the coating material outlet and the atomizing gas outlet are shielded around said atomizing member axis against the particle bed by a sleeve of the at least one atomizing member.

14. A method for coating particles, comprising the steps of introducing a batch of particles into a vessel having a wall, agitating the particles during coating of the particles by rotating a rotor which is located under the particles about a vertical axis, so that the particles form a particle bed on the rotor, wherein during coating of the particles, a process gas is passed upward through an annular gap present between the wall and the rotor, wherein at least one atomizing member defining an atomizing member axis and having a coating material outlet, an atomizing gas outlet and an envelope gas outlet is provided, wherein the envelope gas outlet encompasses the atomizing gas outlet which in turn encompasses the coating material outlet when viewed in a direction parallel to the atomizing member axis, wherein the at least one atomizing member is disposed to protrude into the particle bed and said outlets are inside the particle bed, wherein at least a portion of a solid coating material is melted, sprayed through said coating material outlet in the molten state and atomized thereby by means of atomizing gas emerging out of the atomizing gas outlet so as to form a coating material jet, wherein coating material contained in said coating material jet is sprayed onto particles present in the particle bed, wherein an envelope gas jet emerging from the envelope gas outlet is produced so that the envelope gas jet is radially spaced from the coating material jet in a space region that is inside the particle bed and adjacent to said outlets, wherein the atomizing gas is heated to a temperature above the melting point of the molten coating material or of the molten part of the coating material, wherein the temperature of the process gas and of an envelope gas forming the envelope gas jet are below the temperature of the atomizing gas and wherein the molten coating material sprayed onto the particles is then solidified by cooling.

15. A method as claimed in claim 14 wherein each particle is moved several times in succession past the coating material outlet of said at least one atomizing member and sprayed thereby during a spray interval with molten coating material and wherein each particle is moved over the rotor and cooled during cooling intervals between successive spray intervals so that the coating material sprayed on a particle can be plastically deformed during the cooling intervals if the particle touches at least one of another particle, of the supporting surface of the rotor, or of the wall.

16. A method for coating particles with a coating material within a processing space of a vessel, the processing space defined by a wall of the vessel and a rotor, the rotor being rotatable about a vertical axis, and an atomizing member, defining an atomizing member axis, including a coating material outlet, an atomizing gas outlet disposed annularly about the coating material outlet, and an envelope gas outlet disposed annularly about the atomizing gas outlet, said atomizing member protruding through the wall of the vessel, within the processing space of the vessel, wherein the method comprises the steps of     forming an annular gap between the rotor and the wall of the vessel;

rotating the rotor about its vertical axis so that the particles form a particle bed on the vessel;

providing a coating material jet within the particle bed by melting at least a portion of the coating material, passing said molten coating material through the coating material outlet, passing atomizing gas through the atomizing gas outlet, said atomizing gas heated to a temperature above the melting point of the molten part of the coating material;

providing an envelope gas jet within the particle bed by passing envelope gas through the envelope gas outlet, said envelope gas being below the temperature of the melting point of the molten part of the coating material, whereby the envelope gas jet encompasses the coating material jet to create a cavity within the particle bed, adjacent said outlets, which cavity contains fewer particles per unit volume than the remaining particle bed so that the particles closest to the coating material outlet are separated by voids.

17. An apparatus for coating particles with a coating material, comprising a vessel having a wall, a rotor which is rotatable therein about a vertical axis and having a supporting surface for supporting and agitating the particles, a heating device for melting at least a portion of the coating material, at least one heating device for heating an atomizing gas to a temperature lying above the melting point of the molten coating material or its molten part, and at least one atomizing member including a coating material outlet for spraying the at least partly molten coating material onto the particles, an envelope gas passage with an end part that has an annular cross-section, is substantially parallel to said atomizing member axis and forms an envelope gas outlet encompassing the coating material outlet, when viewed in a direction parallel to said atomizing member axis, and an atomizing gas passage with an end part having a mouth and forming an atomizing gas outlet which encloses said coating material outlet and is disposed between the coating material outlet and said envelope gas outlet in a projection parallel to said atomizing member axis, wherein means are provided for causing the atomizing gas to emerge out of said atomizing gas outlet so that the atomizing gas atomizes the coating material, said atomizing member positioned so as to protrude into a particle bed formed by particles lying on the supporting surface in such a way that said outlets are within the particle bed, means for providing an annular gap between said wall and said rotor at least during coating, means for passing process gas in an upward direction through said gap, and means for producing an envelope gas jet emerging from said envelope gas outlet in such a manner that the envelope gas jet encompasses the coating material sprayed from said coating material outlet and is spaced radially to said axis from the sprayed coating material in a space region inside the particle bed.

18. An apparatus as claimed in claim 17, wherein the coating material outlet of said at least one atomizing member has a mouth with a center that is arranged at most 6 cm above the supporting surface of the rotor when the rotor is in its position intended for coating particles.

19. An apparatus as claimed in claim 17, further comprising means for rotating the rotor in a rotational direction and wherein said atomizing member axis is horizontal and has, in a direction directed away from the coating material outlet, a component which is parallel to the velocity of a region of the rotor which is vertically below the coating material outlet while the rotor is rotated in said rotational direction.

20. An apparatus as claimed in claim 17, wherein said at least one atomizing member comprises an inner sleeve, an intermediate sleeve encompassing the inner sleeve, and an outer sleeve encompassing the intermediate sleeve, wherein the inner sleeve contains a coating material passage with a mouth forming said coating material outlet, wherein a cavity is defined between the inner sleeve and the intermediate sleeve, which cavity forms said atomizing gas passage, wherein a cavity is defined between the intermediate sleeve and the outer sleeve which cavity forms said envelope gas passage, and wherein the coating material outlet and the atomizing gas outlet are inside the outer sleeve.

21. An apparatus as claimed in claim 17, wherein said atomizing gas passage has an annular cross-section, said atomizing gas passage converging toward the mouth of the atomizing gas outlet.

* * * * *